(12) United States Patent
Xu et al.

(10) Patent No.: US 11,182,589 B2
(45) Date of Patent: Nov. 23, 2021

(54) METHODS AND APPARATUSES FOR DETERMINING FACE IMAGE QUALITY, ELECTRONIC DEVICES, AND COMPUTER STORAGE MEDIA

(71) Applicant: SHENZHEN SENSETIME TECHNOLOGY CO., LTD., Shenzhen (CN)

(72) Inventors: Lifei Xu, Shenzhen (CN); Chendi Yu, Shenzhen (CN); Wenzhi Liu, Shenzhen (CN)

(73) Assignee: SHENZHEN SENSETIME TECHNOLOGY CO., LTD., Shenzhen (CN)

( * ) Notice: Subject to any disclaimer, the term of this patent is extended or adjusted under 35 U.S.C. 154(b) by 103 days.

(21) Appl. No.: 16/655,235

(22) Filed: Oct. 17, 2019

(65) Prior Publication Data

US 2020/0050835 A1 Feb. 13, 2020

Related U.S. Application Data

(63) Continuation of application No. PCT/CN2018/087915, filed on May 22, 2018.

(30) Foreign Application Priority Data

May 31, 2017 (CN) .......................... 201710405232.9

(51) Int. Cl.
*G06K 9/00* (2006.01)
*G06T 7/62* (2017.01)
*G06T 7/70* (2017.01)
*G06T 11/20* (2006.01)

(52) U.S. Cl.
CPC ............ *G06K 9/00228* (2013.01); *G06T 7/62* (2017.01); *G06T 7/70* (2017.01); *G06T 11/20* (2013.01); *G06T 2207/30201* (2013.01); *G06T 2207/30244* (2013.01); *G06T 2210/12* (2013.01)

(58) Field of Classification Search
CPC .................................................. G06K 9/00288
See application file for complete search history.

(56) References Cited

U.S. PATENT DOCUMENTS 7,391,888 B2 6/2008 Hu
7,844,086 B2 11/2010 Hu
8,135,183 B2 3/2012 Hu
(Continued)

FOREIGN PATENT DOCUMENTS

CN 1573660 A 2/2005
CN 102799877 A 11/2012
(Continued)

OTHER PUBLICATIONS

Written Opinion of the Singaporean application No. 11201909737V, dated Jun. 2, 2020.
(Continued)

*Primary Examiner* — Hadi Akhavannik
(74) *Attorney, Agent, or Firm* — Syncoda LLC; Feng Ma

(57) ABSTRACT

A methods for determining face image quality includes: obtaining pose angle information and/or size information of a face in an image; and obtaining quality information of the face in the image on the basis of the pose angle information and/or the size information of the face.

17 Claims, 8 Drawing Sheets

(56) References Cited

U.S. PATENT DOCUMENTS

| | | | |
|---|---|---|---|
| 8,254,647 B1* | 8/2012 | Nechyba | G06K 9/036 |
| | | | 382/118 |
| 8,457,358 B2 | 6/2013 | Hu | |
| 2004/0240708 A1 | 12/2004 | Hu | |
| 2006/0193494 A1* | 8/2006 | Toyama | G06K 9/00228 |
| | | | 382/103 |
| 2006/0233422 A1* | 10/2006 | Toyama | G06T 7/73 |
| | | | 382/103 |
| 2008/0123967 A1 | 5/2008 | Berini | |
| 2008/0298637 A1* | 12/2008 | Hu | G06K 9/6211 |
| | | | 382/103 |
| 2009/0303342 A1* | 12/2009 | Corcoran | G06K 9/00255 |
| | | | 348/222.1 |
| 2011/0050568 A1 | 3/2011 | Hu | |
| 2012/0114198 A1 | 5/2012 | Yang | |
| 2012/0139832 A1 | 6/2012 | Hu | |
| 2013/0251244 A1* | 9/2013 | Wei | G06K 9/00281 |
| | | | 382/159 |
| 2015/0049910 A1* | 2/2015 | Ptucha | G06K 9/621 |
| | | | 382/103 |
| 2015/0110351 A1* | 4/2015 | Csefalvay | G06K 9/00228 |
| | | | 382/103 |
| 2015/0117786 A1* | 4/2015 | James | G06F 16/51 |
| | | | 382/195 |
| 2017/0124385 A1* | 5/2017 | Ganong | G06F 16/50 |

FOREIGN PATENT DOCUMENTS

| | | |
|---|---|---|
| CN | 103824068 A | 5/2014 |
| CN | 105046227 A | 11/2015 |
| CN | 105631439 A | 6/2016 |
| CN | 106295585 A | 1/2017 |
| CN | 106446851 A | 2/2017 |
| JP | 2004362569 A | 12/2004 |
| JP | 2007028555 A | 2/2007 |
| JP | 2007206898 A | 8/2007 |
| JP | 2009237993 A | 10/2009 |
| JP | 2011221108 A | 11/2011 |
| JP | 2013065119 A | 4/2013 |

OTHER PUBLICATIONS

International Search Report in the international application No. PCT/CN2018/087915, dated Aug. 14, 2018.
English translation of the Written Opinion of the International Search Authority in the international application No. PCT/CN2018/087915, dated Aug. 14, 2018.
First Office Action of the Chinese application No. 201710405232.9, dated Jun. 16, 2019.
First Office Action of the Japanese application No. 2019-556650, dated Dec. 8, 2020.

* cited by examiner

METHODS AND APPARATUSES FOR DETERMINING FACE IMAGE QUALITY, ELECTRONIC DEVICES, AND COMPUTER STORAGE MEDIA

CROSS-REFERENCE TO RELATED APPLICATIONS

This is a continuation application of International Application No. PCT/CN2018/087915 filed on May 22, 2018, which claims priority to Chinese Patent Application No. 201710405232.9 filed May 31, 2017. The disclosures of these applications are incorporated herein by reference in their entirety.

BACKGROUND

With the development of computer vision technologies, face recognition technologies have a great improvement in performance in recent years. Face recognition in non-extreme scenes may reach a level close to that of artificial recognition. Face recognition technologies are more widely applied to various scenes in life.

SUMMARY

The present disclosure relates to computer vision technologies, and in particular, to methods and apparatuses for determining face image quality, electronic devices, and computer storage media.

Embodiments of the present disclosure provide technical solutions for determining face image quality.

A method for determining face image quality provided according to one aspect of the embodiments of the present disclosure includes:

obtaining at least one of pose angle information of a face in an image or size information of the face; and obtaining quality information of the face in the image on the basis of at least one of the pose angle information of the face or the size information of the face.

An apparatus for determining face image quality provided according to another aspect of the embodiments of the present disclosure includes:

a first obtaining module, configured to obtain at least one of pose angle information of a face in an image or size information of the face; and a second obtaining module, configured to obtain quality information of the face in the image on the basis of at least one of the pose angle information of the face or the size information of the face.

An electronic device provided according to still another aspect of the embodiments of the present disclosure includes the apparatus for determining face image quality according to any one of the foregoing embodiments of the present disclosure.

Another electronic device provided according to still another aspect of the embodiments of the present disclosure includes a processor and a memory for storing instructions executable by the processor; where execution of the instructions by the processor causes the processor to perform: obtaining at least one of pose angle information of a face in an image or size information of the face; and obtaining quality information of the face in the image on the basis of at least one of the pose angle information of the face or the size information of the face.

A non-transitory computer storage medium provided according to yet another aspect of the embodiments of the present disclosure is configured to store computer-readable instructions, where execution of the instructions by the processor causes the processor to perform: obtaining at least one of pose angle information of a face in an image or size information of the face; and obtaining quality information of the face in the image on the basis of at least one of the pose angle information of the face or the size information of the face.

A computer program provided according to yet another aspect of the embodiments of the present disclosure, including a computer instruction, where when the computer instruction runs in a processor of a device, the processor executes operations corresponding to method for determining face image quality according to any one of the foregoing embodiments of the present application.

On the basis of methods and apparatuses for determining face image quality, the electronic devices, and the computer storage media provided according to the foregoing embodiments of the present disclosure, pose angle information and/or size information of a face in an image are obtained, and quality of the face in the image is obtained on the basis of the pose angle information and/or the size information of the face.

BRIEF DESCRIPTION OF DRAWINGS

The accompanying drawings constituting a part of the specification describe the embodiments of the present disclosure and are intended to explain the principles of the present disclosure together with the descriptions.

According to the following detailed descriptions, the present disclosure may be understood more clearly with reference to the accompanying drawings.

DETAILED DESCRIPTION

Figure 1:
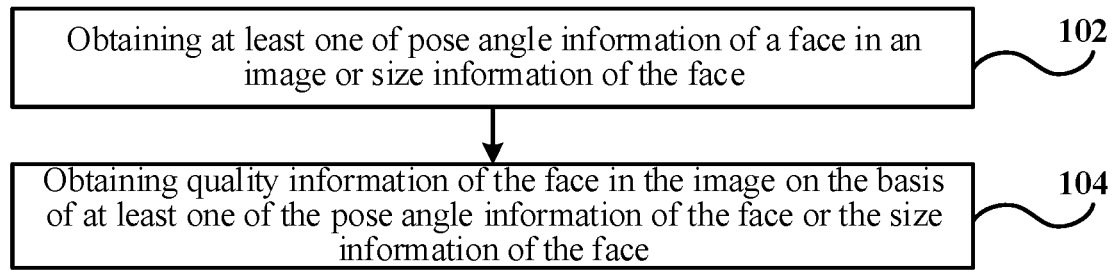
FIG. 1 illustrates a flowchart of one embodiment of a method for determining face image quality according to the present disclosure.

Various exemplary embodiments of the present disclosure are now described in detail with reference to the accompanying drawings. It should be noted that, unless otherwise stated specifically, relative arrangement of the components and operations, the numerical expressions, and the values set forth in the embodiments are not intended to limit the scope of the present disclosure.

In addition, it should be understood that, for ease of description, the size of each part shown in the accompanying drawings is not drawn in actual proportion.

The following descriptions of at least one exemplary embodiment are merely illustrative actually, and are not intended to limit the present disclosure and the applications or uses thereof.

Technologies, methods and devices known to a person of ordinary skill in the related art may not be discussed in detail, but such technologies, methods and devices should be considered as a part of the specification in appropriate situations.

It should be noted that similar reference numerals and letters in the following accompanying drawings represent similar items. Therefore, once an item is defined in an accompanying drawing, the item does not need to be further discussed in the subsequent accompanying drawings.

The embodiments of the present disclosure may be applied to electronic devices such as terminal devices, computer systems, and servers, which may operate with numerous other general-purpose or special-purpose computing system environments or configurations. Examples of well-known terminal devices, computing systems, environments, and/or configurations suitable for use together with the electronic devices such as terminal devices, computer systems, and servers include, but are not limited to, Personal Computer (PC) systems, server computer systems, thin clients, thick clients, handheld or laptop devices, microprocessor-based systems, set top boxes, programmable consumer electronics, network PCs, minicomputer systems, mainframe computer systems, distributed cloud computing environments that include any one of the foregoing systems.

The electronic devices such as terminal devices, computer systems, and servers may be described in the general context of computer system-executable instructions (for example, program modules) executed by the computer system. Generally, the program modules may include routines, programs, target programs, components, logics, data structures, and the like for performing specific tasks or implementing specific abstract data types. The computer systems/servers may be implemented in the distributed cloud computing environments in which tasks are performed by remote processing devices linked via a communication network. In the distributed computing environments, the program modules may be located in local or remote computing system storage media including storage devices.

FIG. 1 is a flowchart of one embodiment of a method for determining face image quality according to the present disclosure. As shown in FIG. 1, the method for determining face image quality of this embodiment includes:

102: pose angle information and/or size information of a face in an image are obtained.

A pose angle of the face is a head pose angle of human, including a yaw angle and a pitch angle of the face in head normalized spherical coordinates (i.e., an image acquisition coordinate system), where the yaw angle is used for indicating a side face angle of the face in a horizontal direction, and the pitch angle is used for indicating head-down or head-up angle of the face in a vertical direction. Under the condition that the face size is fixed, the smaller the yaw angle and the pitch angle are, the more front-facing the face is, the easier the face recognition is, and the higher the face recognition accuracy is. When both the yaw angle and the pitch angle are zero, the face is the most front-facing and the face recognition accuracy is the highest.

The face size is also a face pixel size, and the bigger the face is, the higher the definition is, the easier the face recognition is, and the higher the face recognition accuracy is.

104: Quality information of the face in the image is obtained on the basis of the pose angle information and/or the size information of the face.

The higher the quality of the face in the image is, the better the quality of the face in the image is; on the contrary, the lower the quality of the face in the image is, the worse the quality of the face in the image is.

At present, false recognition may easily occur in a face recognition process. In addition to a recognition algorithm model, the false recognition rate is also related to the quality of the face image. If the quality of face image is poor, for example, the side face angle is excessively large and the face pixel is excessively small, the face recognition accuracy generally decreases, and the false recognition rate is relatively high. In actual scenes, most of false recognition and missing recognition are caused due to the fact that the quality of the face image is not high enough. Therefore, the method for determining face image quality which draws enough attention is helpful for improving the face recognition rate and is very important.

The existing image quality evaluation methods may be divided into two categories: subjective evaluation methods and objective evaluation methods. With the improvement of the automation level, the subjective evaluation methods requiring manual participation in many fields have a lot of inconvenience, high costs and long cycles, and therefore the objective evaluation methods are gradually developed. Currently, the method for determining face image quality has not attracted enough attention, the objective evaluation method for face image quality is not yet mature, and the evaluation result for face image quality is inaccurate enough.

In order to evaluate the face image quality, face image quality evaluation indexes need to be established, and evaluation criteria for good face image quality need to be defined. In order to improve the face recognition rate, defining evaluation criteria for good face image quality should enable the face to be easily recognized, for example, the face is easy to be recognized when needing to meet conditions such as high definition, big face, and front-facing face. In actual application scenes, the definition of the face image is influenced by two aspects: one is that the image captured by a camera is blurred, and the other is that the face image itself is excessively small. Since the size of the face image needs to be uniformly scaled to a standard size before face image recognition, when a small face image is amplified to the standard size, fuzziness caused by pixel interpolation may exist. In general, after a proper camera is selected according to the application scene, the image captured thereby is clear. Therefore, disregarding the case that the image captured by the camera is not sharp, the definition of the face image and the face size are positively related. The bigger the face is, the higher the definition is. The face definition may be evaluated by using the face size.

According to the method for determining face image quality in the embodiments of the present disclosure, from the perspective of facilitating face recognition, the face image quality is evaluated on the basis of key factors affecting the face recognition result (for example, face definition, face size, and whether the face is front-facing), and indexes for evaluating the key factors affecting the face recognition result are obtained: a pose angle of the face and a face size. The front-facing degree of the face is determined based on the pose angle of the face, the face definition is determined based on the face size, and the face image quality is evaluated according to the pose angle information and the size information of the face. According to the technical solutions for determining face image quality in the embodiments of the present disclosure, the face image quality is objectively evaluated, and the accuracy rate of the evaluation result of the face image quality is high; in addition, according to the embodiments of the present disclosure, by obtaining the size information of the face to reflect the face definition affecting the face recognition result instead of directly obtaining the face definition in the image, as compared with directly obtaining the face definition in the image, the method improves the operation efficiency and increases the real-time performance of the face quality evaluation.

According to one or more embodiments of the present disclosure, in operation 102, the obtaining the pose angle information of the face in the image may be implemented in the following mode:

a face detection bounding box in the image and key point coordinates of the face determined according to the face detection bounding box are obtained. For example, face detection may be performed on the image to obtain the face detection bounding box, and key point (for example, corners of eyes and mouth) positioning is performed on the face in the face detection bounding box to obtain key point coordinates of the face; the pose angle information of the face is obtained according to the key point coordinates of the face, where the pose angle information of the face includes a yaw angle and a pitch angle of the face.

According to one or more embodiments of the present disclosure, in operation 102, the obtaining the size information of the face in the image may be implemented in the following mode: obtaining the size information of the face according to the size of the face detection bounding box, where the size of the face detection bounding box includes length and/or width of the face detection bounding box.

The technical solutions provided according to the embodiments of the present disclosure include the following beneficial effects:

Through the method for evaluating face image quality based on key factors affecting a face recognition result (face definition, face size, and whether the face is front-facing), indexes for evaluating the key factors affecting the face recognition result are obtained: a pose angle of the face for reflecting whether the face is front-facing, and face size for reflecting face definition and face size; and a method for evaluating face image quality according to pose angle information and size information of a face is obtained. According to the technical solutions for determining face image quality in the embodiments of the present disclosure, the face image quality may be objectively evaluated, and the accuracy rate of the evaluation result of the face image quality is high; in addition, in the embodiments of the present disclosure, by obtaining the size information of the face to reflect the face definition affecting the face recognition result instead of directly obtaining the face definition in the image, as compared with directly obtaining the face definition in the image, the method facilitates improving the operation efficiency and increasing the real-time performance of face quality evaluation.

It should be understood that the above general description and the following detailed description are merely exemplary and explanatory and are not intended to limit the present disclosure. The following further describes in detail the technical solutions of the present disclosure with reference to the accompanying drawings and embodiments.

According to one or more embodiments of the present disclosure, operation 104 may include: obtaining the score of the pose angle of the face according to the pose angle information of the face; obtaining the score of the face size according to the size information of the face; and obtaining a quality score of the face in the image according to the score of the pose angle of the face and the score of the face size.

Figure 2:
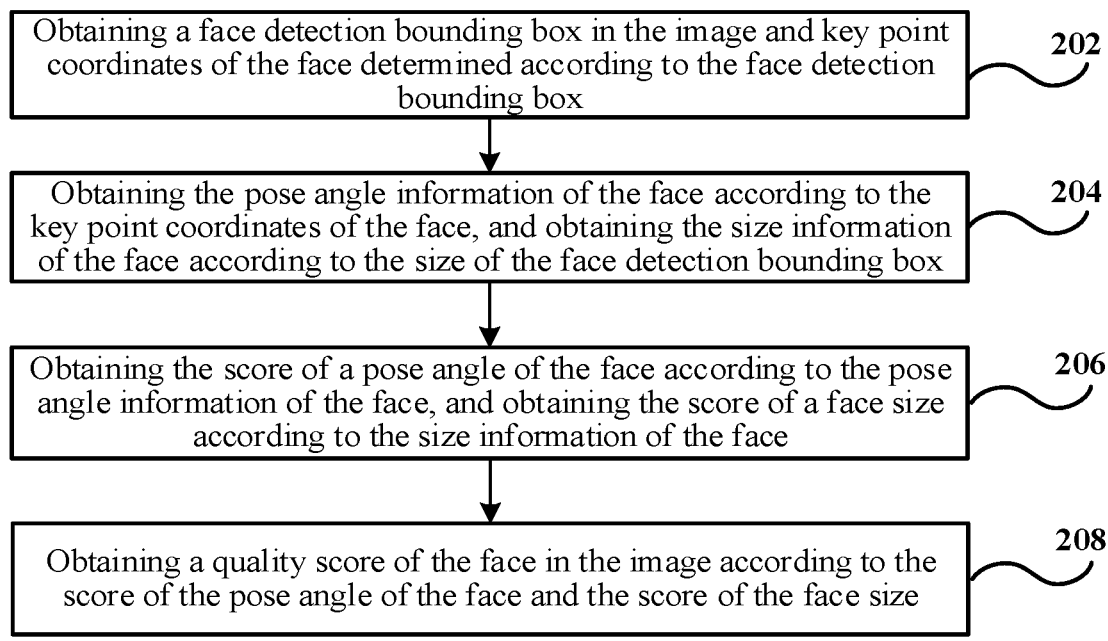
FIG. 2 illustrates a flowchart of another embodiment of a method for determining face image quality according to the present disclosure.

FIG. 2 is a flowchart of another embodiment of a method for determining face image quality according to the present disclosure. As shown in FIG. 2, the method for determining face image quality of this embodiment includes:

202: a face detection bounding box in the image and key point coordinates of the face determined according to the face detection bounding box are obtained.

The face detection bounding box includes a face image detected from the image.

For example, face detection may be performed on the image by means of a face detection algorithm to obtain the face detection bounding box;

for example, key point positioning is performed on the face in the face detection bounding box by means of a key point detection algorithm to obtain the key point coordinates of the face.

204: The pose angle information of the face is obtained according to the key point coordinates of the face, and the size information of the face is obtained according to the size of the face detection bounding box.

The size of the face detection bounding box includes length and/or width of the face detection bounding box. In a specific example, the size of the face detection bounding box is the face size. A pose angle of the face is a head pose angle of the human, including a yaw angle and a pitch angle of the face in head normalized spherical coordinates (i.e., an image acquisition coordinate system), where the yaw angle is used for indicating the angle of the side face of the face in a horizontal direction, and the pitch angle is used for indicating the head-down or head-up angle of the face in a vertical direction. Under the condition that the face size is fixed, the smaller the yaw angle and the pitch angle are, the more front-facing the face is, the easier the face recognition is, and the higher the face recognition accuracy is. When both the yaw angle and the pitch angle are zero, the face is the most front-facing and the face recognition accuracy is the highest.

The face size is also the face pixel size, and the bigger the face is, the higher the definition is, the easier the face recognition is, and the higher the face recognition accuracy is.

206: The score of the pose angle of the face is obtained according to the pose angle information of the face, and the score of the face size is obtained according to the size information of the face.

According to one or more embodiments of the present disclosure, the score of the pose angle of the face may be obtained in the following mode: according to the yaw angle and the pitch angle of the face, obtaining the score $Q_{yaw}$ of the yaw angle yaw of the face by calculation based on $$Q_{yaw} = e^{-10*\frac{yaw^2}{90*90}},$$

and obtaining the score $Q_{pitch}$ of the pitch angle ("pitch") of the face by calculation based on $$Q_{pitch} = e^{-10*\frac{pitch^2}{90*90}}.$$

According to one or more embodiments of the present disclosure, the score of the face size may be obtained in the following mode: obtaining the score of the face size on the basis of at least one of length, width, or area of the face detection bounding box, where the area of the face detection bounding box is obtained by the product of the length and the width of face detection bounding box. The length, width, and area of face detection bounding box correspond to the size of the face image. Therefore, the score of the face size may be determined on the basis of at least one of length, width, or area of the face detection bounding box.

Further exemplarily, the obtaining the score of the face size on the basis of at least one of length, width, or area of the face detection bounding box, for example, may be: selecting a smaller value min in the length and the width of the face detection bounding box; and obtaining the score $Q_{rect}$ of the face size by calculation based on $$Q_{rect} = \frac{1}{1 + e^{\frac{-2*(min-50)}{75}}}$$

according to the smaller value min in the length and the width.

The face size may be better determined by means of the smaller value in the length and the width of the face detection bounding box, so that the score of the face size is obtained by calculation on the basis of the smaller value in the length and the width of the face detection bounding box, and the face size may be reflected more objectively.

208: The quality score of the face in the image is obtained according to the score of the pose angle of the face and the score of the face size.

The higher the quality score of the face in the image is, the better the quality of the face in the image is; on the contrary, the lower the quality score of the face in the image is, the worse the quality of the face in the image is.

According to one or more embodiments of the present disclosure, operation 208 may be implemented in the following mode:

The quality score of the face in the image is obtained by calculation according to the score of the yaw angle and its weight, the score of the pitch angle and its weight, and the score of the face size and its weight.

The weight of the score of the yaw angle, the weight of the score of the pitch angle, and the weight of the score of the face size may be preset, and may be adjusted according to actual requirements. In general, the yaw angle has the greatest influence on the accuracy of the face recognition result. In a specific application, the weight of the score of the yaw angle may be set to be greater than the weight of the score of the pitch angle and the weight of the score of the size of the face, so that the obtained quality score of the face in the image may more accurately and objectively reflect the quality of the face in one image.

According to the method for determining face image quality in the embodiments of the present disclosure, from the perspective of facilitating face recognition, the face image quality is evaluated on the basis of key factors affecting the face recognition result (face definition, face size, and whether the face is front-facing), and indexes for evaluating the key factors affecting the face recognition result are obtained: a pose angle of the face and a face size. The front-facing degree of the face is determined based on the pose angle of the face, the face definition is determined based on the face size, the score of the pose angle of the face and the score of the face size are further obtained. The quality score of the face in the image is obtained according to the score of the pose angle of the face and the score of the face size, so as to more accurately and objectively evaluate the quality of the face in the image, and the accuracy rate of the evaluation result of the face image quality is high; in addition, according to the embodiments of the present disclosure, by obtaining the size information of the face to reflect the face definition affecting the face recognition result instead of directly obtaining the face definition in the image, as compared with the directly obtaining the face definition in the image, the method improves the operation efficiency and increases the real-time performance of the face quality evaluation.

Figure 3:
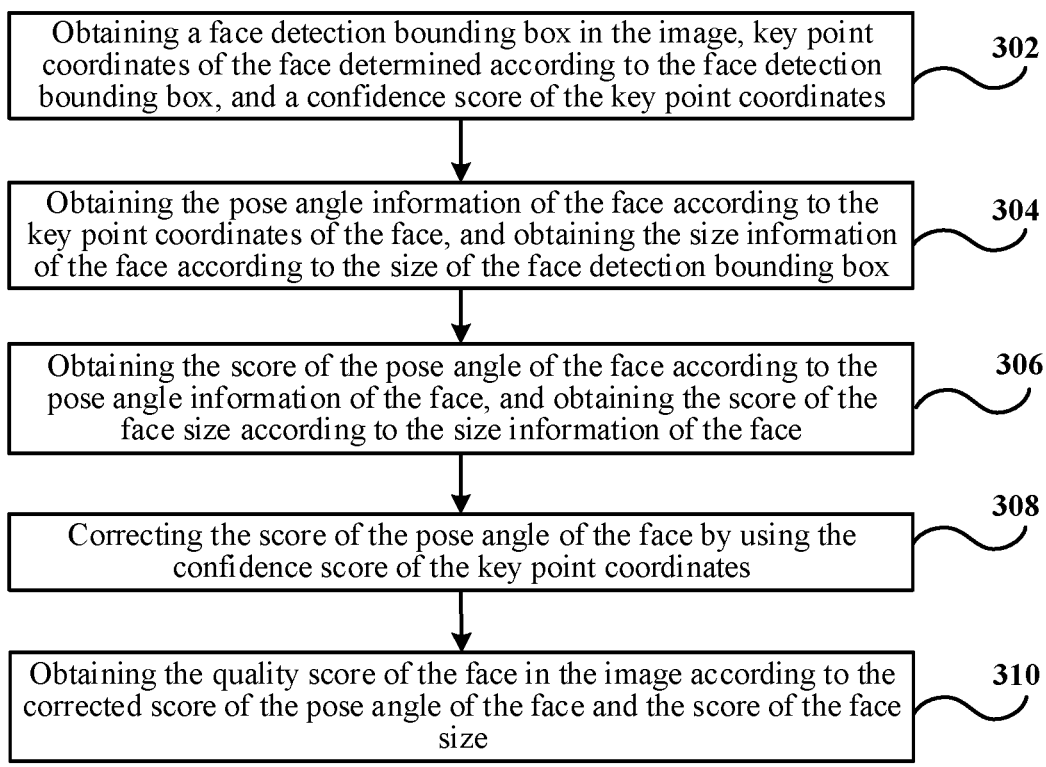
FIG. 3 illustrates a flowchart of still another embodiment of a method for determining face image quality according to the present disclosure.

FIG. 3 is a flowchart of still another embodiment of a method for determining face image quality according to the present disclosure. As shown in FIG. 3, the method for determining face image quality of this embodiment includes:

302: a face detection bounding box in the image, key point coordinates of the face determined according to the face detection bounding box, and a confidence score of the key point coordinates are obtained.

The confidence score of the key point coordinates is used for indicating the accuracy of the key point coordinates of the face, and the greater the numerical value of the confidence score is, the more accurate the key point coordinates of the face are.

According to one or more embodiments of the present disclosure, operation 302 may be implemented through a pre-trained first neural network. After receiving an input image, the first neural network outputs the face detection bounding box, the key point coordinates of the face determined according to the face detection bounding box, and the confidence score of the key point coordinates by performing face detection and key point detection on the image. The confidence score of the key point coordinates may be determined by the first neural network on the basis of the performance of the first neural network and the size of the face detection bounding box according to a preset mode. The better the performance of the first neural network is, and the larger the face detection bounding box is (i.e., the face image is relatively large, and the face is relatively clear), the higher the accuracy of the determined key point coordinates of the face is.

304: The pose angle information of the face is obtained according to the key point coordinates of the face, and the size information of the face is obtained according to the size of the face detection bounding box, where the pose angle information of the face includes a yaw angle and a pitch angle of the face.

306: The score of the pose angle of the face is obtained according to the pose angle information of the face, and the score of the face size is obtained according to the size information of the face.

According to one or more embodiments of the present disclosure, the score of the pose angle of the face may be obtained in the following mode:

according to the yaw angle and the pitch angle of the face, obtaining the score $Q_{yaw}$ of the yaw angle yaw of the face by calculation based on $$Q_{yaw} = e^{-10*\frac{yaw^2}{90*90}},$$

and obtaining the score $Q_{pitch}$ of the pitch angle ("pitch") of the face by calculation based on $$Q_{pitch} = e^{-10*\frac{pitch^2}{90*90}}.$$

According to one or more embodiments of the present disclosure, the score of the face size may be obtained in the following mode: obtaining the score of the face size on the basis of at least one of length, width, or area of the face detection bounding box, where the area of the face detection bounding box is obtained by the product of the length and the width of face detection bounding box.

The length, width, and area of face detection bounding box correspond to the size of the face image. Therefore, the score of the face size may be determined on the basis of at least one of length, width, or area of the face detection bounding box.

Further exemplarily, the obtaining the score of the face size on the basis of at least one of length, width, or area of the face detection bounding box, for examples, may be: selecting a smaller value min in the length and the width of the face detection bounding box; and obtaining the score $Q_{rect}$ of the face size by calculation based on $$Q_{rect} = \frac{1}{1 + e^{\frac{-2*(min-50)}{75}}}$$

according to the smaller value min in the length and the width.

The face size may be better determined by means of the smaller value in the length and the width of the face detection bounding box, so that the score of the face size is obtained by calculation on the basis of the smaller value in the length and the width of the face detection bounding box, and the face size may be reflected more objectively.

308: The pose angle of the face is corrected by using the confidence score of the key point coordinates.

Exemplarily, by using the confidence score of the key point coordinates, the corrected score $Q_{yaw}$ of the yaw angle and the corrected score $Q_{pitch}$ of the pitch angle are obtained by calculation based on $$Q_{yaw} = a * e^{-10*\frac{yaw^2}{90*90}} \text{ and}$$

$$Q_{pitch} = a * e^{-10*\frac{pitch^2}{90*90}}$$

respectively, where $$a = \begin{cases} Qalign & (Qalign < 0.4) \\ 1 & (Qalign > 0.4) \end{cases},$$

and Qalign a represents the confidence score of the key point coordinates. According to one or more embodiments of the present disclosure, operation 308 may be performed simultaneously with the operation of obtaining the score of the face size, before or after the operation of obtaining the score of the face size, and no execution time limit exists between the two operations.

310: The quality score of the face in the image is obtained according to the corrected score of the pose angle of the face and the score of the face size.

When the key point coordinates of the face are inaccurate, the pose angle information of the face obtained based on the key point coordinates is also inaccurate. In order to solve the problem of the inaccuracy of evaluation of the pose angle information of the face due to the inaccuracy of the key point coordinates, in the embodiments of the present disclosure, the score of the pose angle of the face obtained by calculation is correspondingly corrected according to the confidence score of the key point coordinates of the face, so as to eliminate the inaccuracy of evaluation of the pose angle information of the face due to the inaccuracy of the key point coordinates, and the influence on the final determination of the result of the face image quality, and improve the accuracy and reliability of determining the result of the face image quality.

Figure 4:
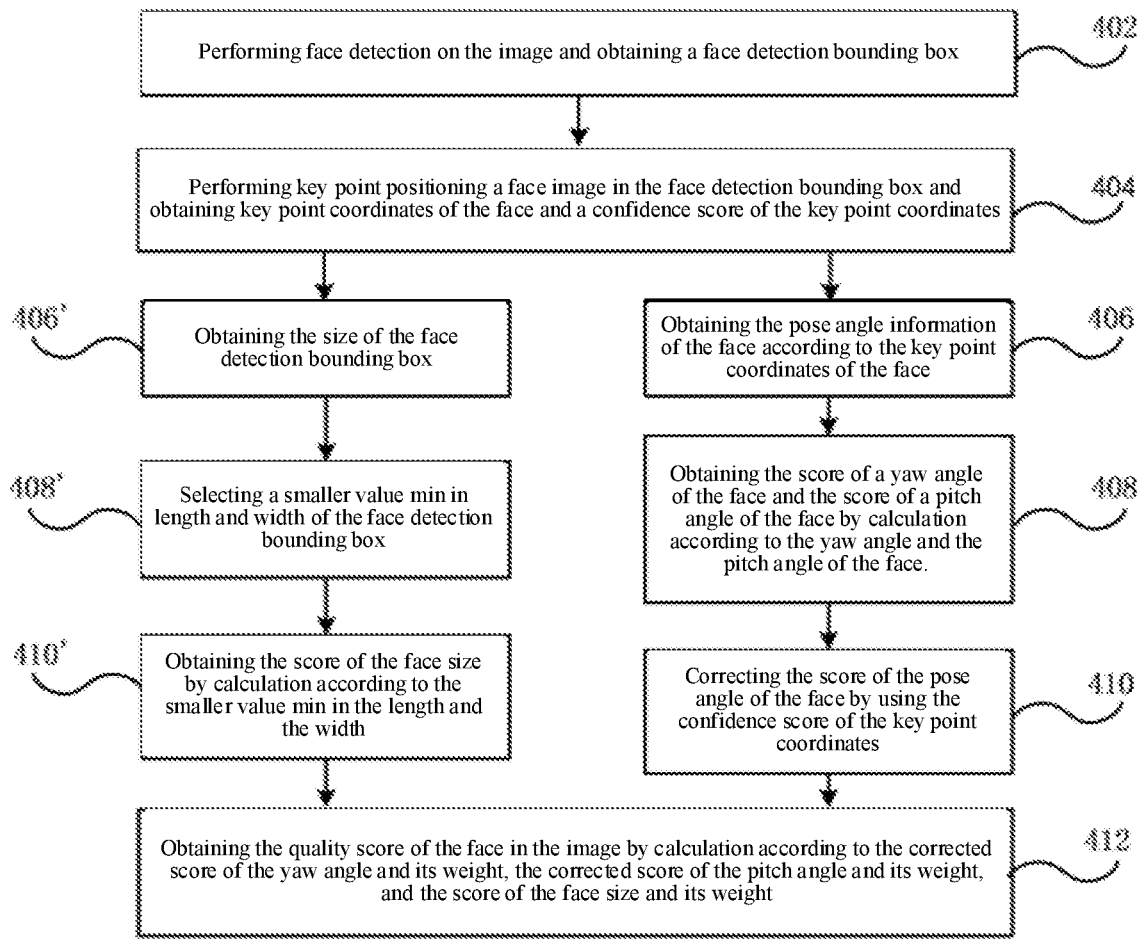
FIG. 4 illustrates a flowchart of one specific application embodiment of a method for determining face image quality according to the present disclosure.

FIG. 4 is a flowchart of a specific application embodiment of a method for determining face image quality according to the present disclosure. As shown in FIG. 4, the method for determining face image quality of this embodiment includes:

402: face detection is performed on the image to obtain a face detection bounding box.

404: Key point positioning is performed on the face in the face detection bounding box to obtain key point coordinates of the face and a confidence score of the key point coordinates. The confidence score of the key point coordinates is used for indicating the accuracy of the key point coordinates of the face.

According to one or more embodiments of the present disclosure, operations 402-404 may be implemented through a pre-trained first neural network. After receiving an input image, the first neural network outputs the face detection bounding box, the key point coordinates of the face, and the confidence score of the key point coordinates by performing face detection and key point detection on the image. The confidence score of the key point coordinates may be determined by the first neural network on the basis of the performance of the first neural network and the size of the face detection bounding box according to a preset mode. The better the performance of the first neural network is, and the larger the face detection bounding box is (i.e., the face image is relatively large, and the face is relatively clear), the higher the accuracy of the determined key point coordinates of the face is.

Then, operations 406 and 406' are executed respectively.

406: The pose angle information of the face is obtained according to the key point coordinates of the face, where the pose angle information of the face includes a yaw angle and a pitch angle of the face. According to one or more embodiments of the present disclosure, operation 406 may be implemented by a pre-trained second neural network. After receiving the key point coordinates of the face, the second neural network outputs the yaw angle and the pitch angle of the face by calculating the key point coordinates of the face.

408: According to the yaw angle and the pitch angle of the face, the score $Q_{yaw}$ of the yaw angle yaw of the face is obtained by calculation based on $$Q_{yaw} = e^{-10*\frac{yaw^2}{90*90}},$$

and the score $Q_{pitch}$ of the pitch angle ("pitch") of the face is obtained by calculation based on $$Q_{pitch} = e^{-10*\frac{pitch^2}{90*90}}.$$

410: The score of the pose angle of the face is corrected by using the confidence score of the key point coordinates.

Exemplarily, by using the confidence score of the key point coordinates, the corrected score $Q_{yaw}$ of the yaw angle and the corrected score $Q_{pitch}$ of the pitch angle are obtained by calculations based on $$Q_{yaw} = a*e^{-10*\frac{yaw^2}{90*90}} \text{ and}$$

$$Q_{pitch} = a*e^{-10*\frac{pitch^2}{90*90}}$$

respectively, where $$a = \begin{cases} Qalign & (Qalign < 0.4) \\ 1 & (Qalign > 0.4) \end{cases},$$

and Qalign represents the confidence score of the key point coordinates.

Then, operation 412 is executed.

406': The size of the face detection bounding box is obtained, including length and width of the face detection bounding box.

408': A smaller value min in the length and the width of the face detection bounding box is selected.

410': The score $Q_{rect}$ of the face size is obtained by calculation based on $$Q_{rect} = \frac{1}{1+e^{\frac{-2*(min-50)}{75}}}$$

according to the smaller value min in the length and the width.

No sequential relation limit of execution time exists between operations 406-410 and operations 406'-410', which may be executed in any time and sequence.

412: The quality of the face in the image is obtained by calculation according to the corrected score of the yaw angle and its weight, the corrected score of the pitch angle and its weight, and the score of the face size and its weight.

For example, the quality of the face in the image may be obtained by calculation based on $Q=w1*Q_{yaw}+w2*Q_{pitch}+w3*Q_{rect}$.

Q is the quality of the face in the image, $Q_{yaw}$ represents the corrected score of the yaw angle ("yaw"), $Q_{pitch}$ represents the corrected score of the pitch angle ("pitch"), and $Q_{rect}$ represents the score of the face size. w1, w2, and w3 respectively represent the weight of the score of the yaw angle, the weight of the score of the pitch angle, and the weight of the score of the face size. Generally, the yaw angle has the greatest influence on the accuracy of the face recognition result, and the value of w1 may be set to 0.6; both the weight w2 of the score of the pitch angle and the weight w3 of the score of the size of the face may be set to 0.2, and may also be adjusted according to actual conditions.

Further, the foregoing embodiments of the method for determining face image quality according to the present disclosure are executed for any one of multiple images of the same face respectively, so as to obtain the quality score of the face in the multiple images. Yet another embodiment of the method for determining face image quality according to the present disclosure may further include: selecting, according to the quality information of the face in the multiple images, selecting at least one image with high face quality for face detection.

On the basis of the embodiments, the images with poor face quality are removed, and the images with high face quality are selected for face detection and recognition. Because the selected images with high face quality have a high face recognition rate, the accuracy of face recognition may be improved, the operation data volume of the face recognition may be reduced, and the face recognition speed of a valid image may be improved.

Figure 5:
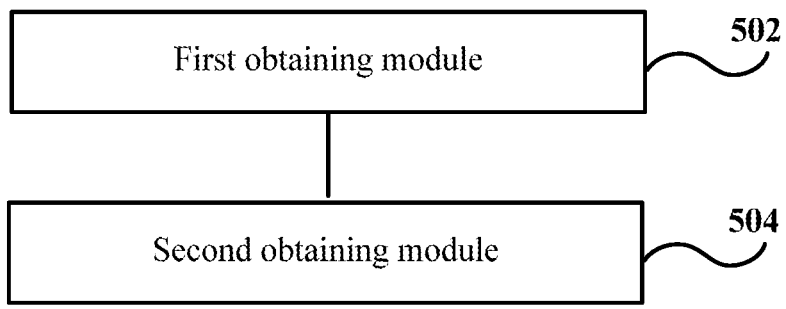
FIG. 5 illustrates a schematic structural diagram of one embodiment of an apparatus for determining face image quality according to the present disclosure.

FIG. 5 is a schematic structural diagram of one embodiment of an apparatus for determining face image quality according to the present disclosure. The apparatus for determining face image quality of this embodiment may be configured to implement the foregoing embodiments of the method for determining face image quality according to the present disclosure. As shown in FIG. 5, the apparatus for determining face image quality of this embodiment includes: a first obtaining module 502 and a second obtaining module 504.

The first obtaining module 502 is configured to obtain pose angle information and size information of a face in an image;

The second obtaining module 504 is configured to obtain quality information of the face in the image on the basis of the pose angle information and the size information of the face.

On the basis of the apparatus for determining face image quality provided according to the foregoing embodiments of the present disclosure, the face image quality is evaluated on the basis of key factors affecting the face recognition result (for example, face definition, face size, and whether the face is front-facing), and indexes for evaluating the key factors affecting the face recognition result are obtained: a pose angle of the face and a face size. The quality of the face in the image is determined according to the pose angle of the face and the face size. According to the technical solutions for determining face image quality in the embodiments of the present disclosure, the face image quality may be objectively evaluated, and the accuracy rate of the evaluation result of the face image quality is high; in addition, according to the embodiments of the present disclosure, by obtaining the size information of the face to reflect the face definition affecting the face recognition result instead of directly obtaining the face definition in the image, as compared with the directly obtaining the face definition in the image, the method facilitates improving the operation efficiency and increasing the real-time performance of the face quality evaluation.

Figure 6:
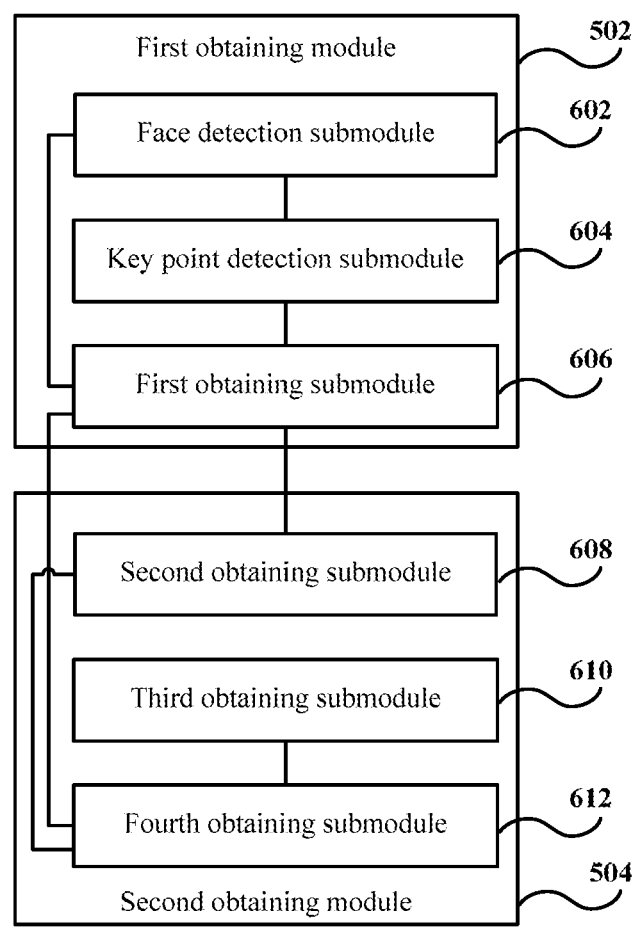
FIG. 6 illustrates a schematic structural diagram of another embodiment of an apparatus for determining face image quality according to the present disclosure.

FIG. 6 is a schematic structural diagram of another embodiment of an apparatus for determining face image quality according to the present disclosure. As shown in FIG. 6, in this embodiment, the first obtaining module 502 specifically includes: a face detection sub-module 602, a key point detection sub-module 604, and a first obtaining sub-module 606.

The face detection sub-module 602 is configured to obtain a face detection bounding box in the image, where the face detection bounding box is configured to determine the face in the image. According to one or more embodiments of the present disclosure, the face detection sub-module 602 may be configured to perform face detection on the image to obtain the face detection bounding box.

The key point detection sub-module 604 is configured to obtain key point coordinates of the face determined according to the face detection bounding box. According to one or more embodiments of the present disclosure, the key point detection sub-module 604 may be configured to perform key point positioning on the face image determined according to the face detection bounding box to obtain the key point coordinates of the face.

The first obtaining sub-module 606 is configured to obtain pose angle information of the face according to the key point coordinates of the face, where the pose angle information of the face includes a yaw angle and a pitch angle of the face, and to obtain size information of the face according to the size of the face detection bounding box, where the size of the face detection bounding box includes length and/or width of the face detection bounding box.

In addition, in the embodiments of the apparatus for determining face image quality, the face detection sub-module 602 is configured to perform face detection on an image to obtain the face detection bounding box, where the face detection bounding box includes the image of the face, called: a face image. Accordingly, the key point detection sub-module 604 is configured to perform key point positioning on the face image determined according to the face detection bounding box to obtain the key point coordinates of the face.

In addition, with reference to FIG. 6 again, in still another embodiment of the apparatus for determining face image quality according to the present disclosure, the second obtaining module 504 may include a second obtaining sub-module 608, a third obtaining sub-module 610, and a fourth obtaining sub-module 612.

The second obtaining sub-module 608 is configured to obtain the score of the pose angle of the face according to the pose angle information of the face.

According to one or more embodiments of the present disclosure, the second obtaining sub-module 608 is configured to obtain, according to the yaw angle and the pitch angle of the face, the score $Q_{yaw}$ of the yaw angle ("yaw") of the face by calculation based on $$Q_{yaw} = e^{-10*\frac{yaw^2}{90*90}},$$

and the score $Q_{pitch}$ of the pitch angle ("pitch") of the face by calculation based on $$Q_{pitch} = e^{-10*\frac{pitch^2}{90*90}}.$$

Further exemplarily, the second obtaining module 608 may obtain the score of the face size on the basis of at least one of length, width, or area of the face detection bounding box in the following mode: selecting a smaller value min in the length and the width of the face detection bounding box; and obtaining the score $Q_{rect}$ of the face size by calculation based on $$Q_{rect} = \frac{1}{1+e^{\frac{-2*(min-50)}{75}}}$$

according to the smaller value min in the length and the width.

The third obtaining sub-module 610 is configured to obtain the score of the face size according to the size information of the face.

According to one or more embodiments of the present disclosure, the third obtaining sub-module 610 is configured to obtain the score of the face size on the basis of at least one of length, width, or area of the face detection bounding box, where the area of the face detection bounding box is obtained by the product of the length and the width of face detection bounding box.

The fourth obtaining sub-module 612 is configured to obtain the quality score of the face in the image according to the score of the pose angle of the face and the score of the face size. According to one or more embodiments of the present disclosure, the fourth obtaining sub-module 612 is configured to obtain the quality of the face in the image by calculation according to the score of the yaw angle and its weight, the score of the pitch angle and its weight, and the score of the face size and its weight. In an actual application, because the yaw angle of the face has the greatest influence on the accuracy of the face recognition result, the weight of the score of the yaw angle may be set to be greater than the weight of the score of the pitch angle and the weight of the score of the face size.

Figure 7:
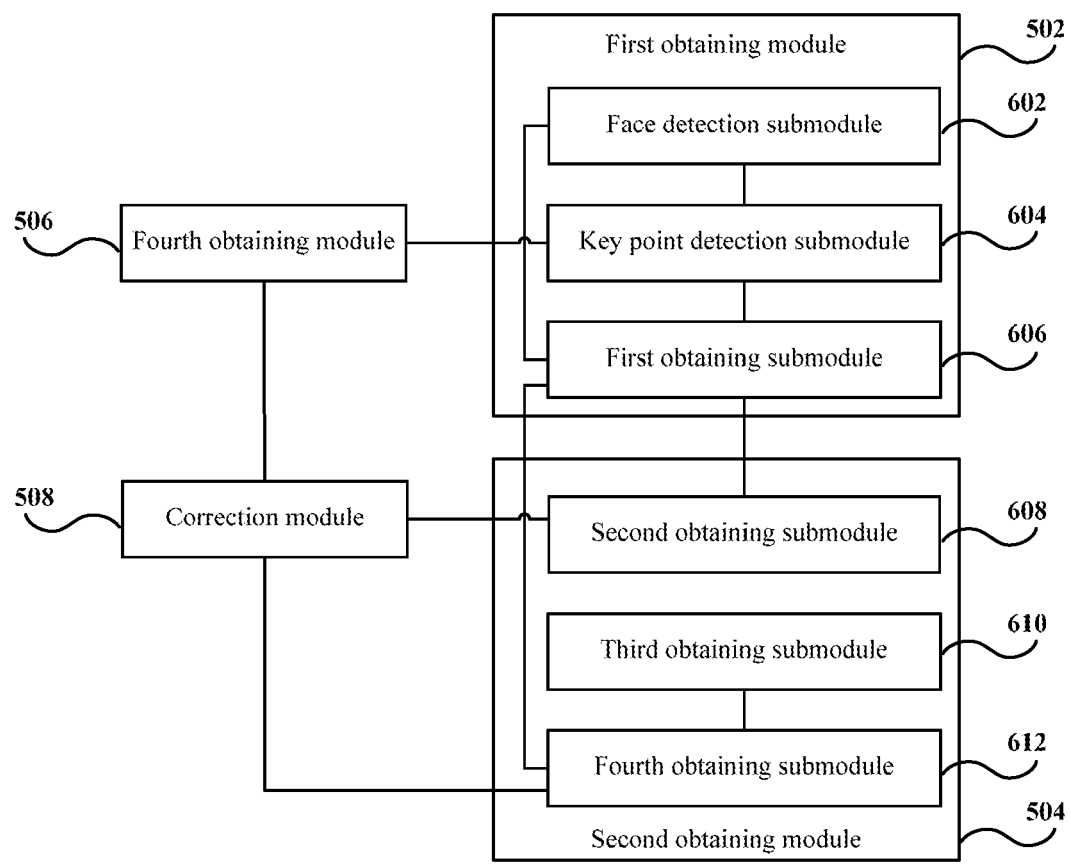
FIG. 7 illustrates a schematic structural diagram of still another embodiment of an apparatus for determining face image quality according to the present disclosure.

FIG. 7 is a schematic structural diagram of still another embodiment of an apparatus for determining face image quality according to the present disclosure. As shown in FIG. 7, compared with the apparatus for determining face image quality according to the foregoing embodiments of the present disclosure, the apparatus for determining face image quality in this embodiment further includes: a fourth obtaining module 506 and a correction module 508.

The fourth obtaining module 506 is configured to obtain the confidence score of the key point coordinates, where the confidence score of the key point coordinates is configured to represent an accuracy rate of the key point coordinates of the face.

Exemplarily, the fourth obtaining module 506 may be integrated with the key point detection sub-module 604, and the two may be implemented by means of a neural network.

The correction module 508 is configured to correct, by using the confidence score of the key point coordinates, the score of pose angle of the face obtained by the second obtaining sub-module 608.

According to one or more embodiments of the present disclosure, the correction module 508 is configured to obtain, by using the confidence score of the key point coordinates, the corrected score $Q_{yaw}$ of the yaw angle and the corrected score $Q_{pitch}$ of the pitch angle by calculation based on yaw $$Q_{yaw} = a*e^{-10*\frac{yaw^2}{90*90}} \text{ and}$$

$$Q_{pitch} = a*e^{-10*\frac{pitch^2}{90*90}}$$

respectively, where $$a = \begin{cases} Qalign & (Qalign < 0.4) \\ 1 & (Qalign > 0.4) \end{cases},$$

and Qalign represents the confidence score of the key point coordinates.

Accordingly, in the embodiments, the fourth obtaining sub-module 612 is configured to obtain the quality of the face in the image according to the corrected score of the pose angle of the face and the score of the face size.

The embodiments of the present disclosure further provide an electronic device, including the apparatus for determining face image quality according to any one of the foregoing embodiments of the present disclosure. By obtaining indexes for evaluating the key factors affecting the face recognition result: a pose angle of the face and face size, and evaluating the face image quality according to the pose angle information and the size information of the face, the face image quality is objectively evaluated, and the accuracy rate of the evaluation result of the face image quality is high; in addition, according to the embodiments of the present disclosure, by obtaining the size information of the face to reflect the face definition affecting the face recognition result instead of directly obtaining the face definition in the image, as compared with the directly obtaining the face definition in the image, the device facilitates improving the operation efficiency and increasing the real-time performance of the face quality evaluation.

Further, the embodiments of the electronic device further include a selection module and a face detection module.

The selection module is configured to select, according to quality information of a face in multiple images output by the apparatus for determining face image quality, at least one image with high face quality;

the face detection module is configured to perform face detection on the selected at least one image.

On the basis of the embodiments, the images with poor face quality are removed, and the images with high face quality are selected for face detection and recognition. Because the selected images with high face quality have a high face recognition rate, the accuracy rate of face recognition may be improved, the operation data volume of face recognition may be reduced, and the face recognition speed of a valid image may be improved.

The embodiments of the present disclosure further provide another electronic device, including: a memory, configured to store executable instructions; and a processor, configured to communicate with the memory to execute the executable instructions so as to complete operations of the method for determining face image quality according to any one of the foregoing embodiments of the present disclosure.

The electronic device according to the foregoing embodiments of the present disclosure, for example, may be a mobile terminal, a PC, a tablet computer, a server, and the like.

The embodiments of the present disclosure further provide a computer storage medium, which is configured to store computer-readable instructions. When the instructions are executed, the operations of the method for determining face image quality according to any one of the foregoing embodiments of the present disclosure are implemented.

Figure 8:
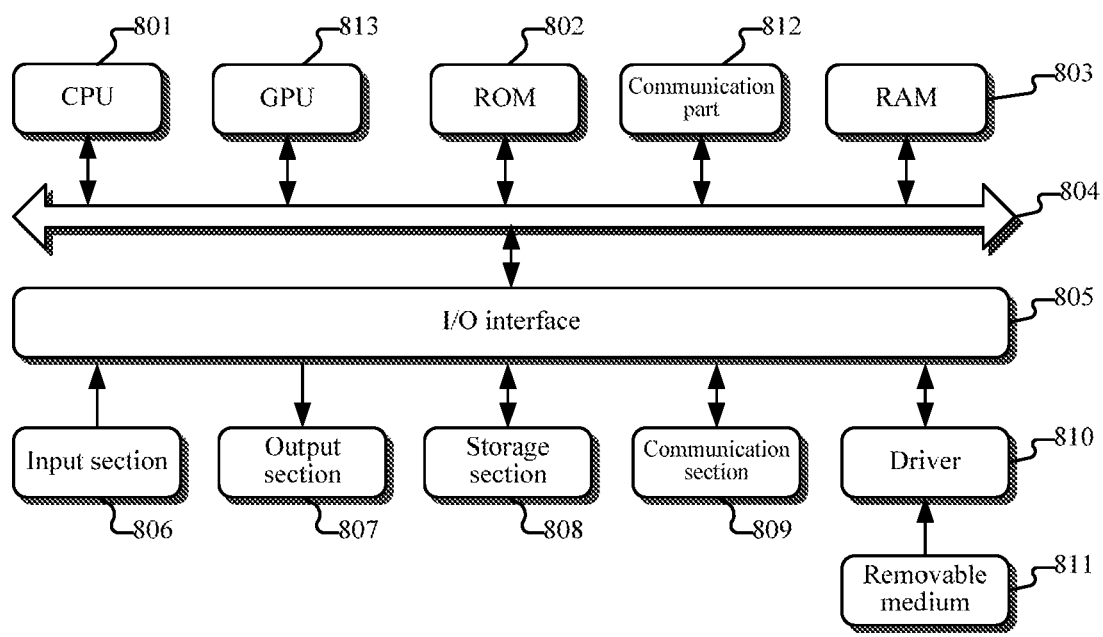
FIG. 8 illustrates a schematic structural diagram of one embodiment of an electronic device of the present disclosure.

FIG. 8 is a schematic structural diagram of one embodiment of an electronic device according to the present disclosure. With reference to FIG. 8 below, a schematic structural diagram of an electronic device suitable for implementing the terminal device or the server of the embodiments of the present disclosure is shown. As shown in FIG. 8, the electronic device includes one or more processors, and a communication part, etc. The one or more processors are, for example, one or more Central Processing Units (CPUs) 801 and/or one or more Graphic Processing Units (GPUs) 813, and the processors may execute appropriate actions and processing according to executable instructions stored in a Read-Only Memory (ROM) 802 or executable instructions loaded from a storage section 808 to a Random Access Memory (RAM) 803. The communication part 812 may include, but is not limited to, a network card. The network card may include, but is not limited to, an InfiniBand (IB) network card.

The processor may communicate with the ROM 802 and/or the RAM 803 to execute executable instructions, is connected to the communication part 812 by means of a bus 804, and communicates with other target devices by means of the communication part 812, so as to complete corresponding operations of any of the methods provided by the embodiments of the present disclosure, for example, obtaining pose angle information and size information of a face in an image, and obtaining quality information of the face in the image on the basis of the pose angle information and the size information of the face.

In addition, the RAM 803 may further store various programs and data required during an operation of the apparatus. The CPU 801, the ROM 802, and the RAM 803 are connected to each other via the bus 804. In the presence of the RAM 803, the ROM 802 is an optional module. The RAM 803 stores executable instructions, or writes executable instructions to the ROM 802 during running. The executable instructions cause the CPU 801 to execute the operations of the communication method. An Input/Output (I/O) interface 805 is also connected to the bus 804. The communication part 812 may be integrated, or may be set as having multiple sub-modules (for example, multiple IB network cards) connected to the bus.

The following components are connected to the I/O interface 805: an input section 806 including a keyboard, a mouse and the like; an output section 807 including a Cathode-Ray Tube (CRT), a Liquid Crystal Display (LCD), a speaker and the like; a storage section 808 including a hard disk and the like; and a communication section 809 of a network interface card including an LAN card, a modem and the like. The communication section 809 executes communication processing through a network such as the Internet. A drive 810 is also connected to the I/O interface 805 according to requirements. A removable medium 811 such as a magnetic disk, an optical disk, a magneto-optical disk, a semiconductor memory or the like is mounted on the drive 810 according to requirements, so that a computer program read from the removable medium may be installed on the storage section 808 according to requirements.

It should be noted that, the architecture shown in FIG. 8 is merely an optional implementation mode. During specific practice, the number and types of the components in FIG. 8 may be selected, decreased, increased, or replaced according to actual needs. Different functional components may be separated or integrated or the like. For example, the GPU 813 and the CPU 801 may be separated, or the GPU 813 may be integrated on the CPU 801, and the communication part may be separated from or integrated on the CPU 801 or the GPU 813 or the like. These alternative implementations all fall within the scope of protection of the present disclosure.

Particularly, a process described above with reference to a flowchart according to the embodiments of the present disclosure may be implemented as a computer software program. For example, the embodiments of the present disclosure include a computer program product. The computer program product includes a computer program tangibly included in a machine-readable medium. The computer program includes a program code for executing a method shown in the flowchart. The program code may include corresponding instructions for correspondingly executing the operations of the method provided by the embodiments of the present disclosure, for example, an instruction for obtaining pose angle information and size information of a face in an image, and an instruction for obtaining quality information of the face in the image on the basis of the pose angle information and the size information of the face. In such embodiments, the computer program may be downloaded and installed from the network through the communication part 809, and/or is installed from the removable medium 811. When executed by the CPU 801, the computer program executes the foregoing functions defined in the method of the present disclosure.

The embodiments of the present disclosure may be optionally applied to: residential area monitoring or security monitoring fields, a capture machine, or products related to face recognition. Face detection is performed on an image collected by a camera (i.e., the image in the embodiments of the present disclosure), and a face image is recognized. In order to improve the accuracy rate of face recognition, reduce the false recognition rate and the missing recognition rate, and avoid unnecessary recognition, it is necessary to first provide images to an apparatus or a device for determining face image quality, the images are screened and filtered, so as to obtain high-quality face images. By evaluating the face image quality, the images having a big side face or deeply head-down or having an extremely low face pixel (i.e., an extremely small face size) may be screened out due to difficulty in accurate recognition. Through the methods, apparatuses, or devices for determining face image quality according to the embodiments of the present disclosure, the quality of a face in various images may be obtained, and the images having low face quality and unsuitable for face recognition are effectively filtered out, so as to reduce the number of face recognitions and improve the face recognition efficiency. In a scene where the embodiments of the present disclosure are applied to an embedded device for face recognition which is time-consuming, the effect is more obvious.

The embodiments of the present disclosure have at least the following beneficial technical effects: according to the embodiments of the present disclosure, face image requirements facilitating face recognition are fully considered, a pose angle of a face is evaluated and evaluation indexes are designed in combination of the face size, the face image quality is comprehensively evaluated based on the combination of a yaw angle and a pitch angle of the face and the face size, and conditions which may cause inaccurate evaluation of the pose angle of the face are corrected. The method is high in real-time performance and easy to apply, and the accuracy and reliability of the evaluation method are ensured. By obtaining the size information of the face to reflect the face definition affecting the face recognition result instead of directly obtaining the face definition in the image, as compared with the directly obtaining the face definition in the image, the method facilitates improving the operation efficiency and increasing the real-time performance of the face quality evaluation. By removing the images with poor face quality and selecting the images with high face quality for face detection and recognition, the accuracy rate of face recognition may be improved, the operation data volume of face recognition may be reduced, and the face recognition speed of a valid image may be improved.

A person of ordinary skill in the art may understand that: all or some operations for implementing the foregoing method embodiments are achieved by a program by instructing related hardware; the foregoing program may be stored in a computer-readable storage medium; when the program is executed, operations including the foregoing method embodiments are executed. Moreover, the foregoing storage medium includes various media capable of storing program codes, such as a ROM, a RAM, a magnetic disk, or an optical disk.

Various embodiments in this description are all described in a progressive manner, for same or similar parts in the embodiments, refer to these embodiments, and each embodiment focuses on a difference from other embodiments. The system embodiments correspond to the method embodiments substantially and therefore are only described briefly, and for the associated part, refer to the descriptions of the method embodiments.

The methods and the apparatuses of the present disclosure may be implemented in many manners. For example, the methods and apparatuses of the present disclosure may be implemented by using software, hardware, firmware, or any combination of software, hardware, and firmware. Unless otherwise specially stated, the foregoing sequences of operations of the methods are merely for description, and are not intended to limit the operations of the methods of the present disclosure. In addition, in some embodiments, the present disclosure may be implemented as programs recorded in a recording medium. The programs include machine-readable instructions for implementing the methods according to the present disclosure. Therefore, the present disclosure further covers the recording medium storing the programs for performing the methods according to the present disclosure.

The descriptions of the present disclosure are provided for the purpose of examples and description, and are not intended to be exhaustive or limit the present disclosure to the disclosed form. Many modifications and changes are obvious to a person of ordinary skill in the art. The embodiments are selected and described to better describe a principle and an actual application of the present disclosure, and to make a person of ordinary skill in the art understand the present disclosure, so as to design various embodiments with various modifications applicable to particular use.

The invention claimed is:

1. A method for determining face image quality, comprising:
   obtaining at least one of pose angle information of a face in an image or size information of the face; and
   obtaining quality information of the face in the image on the basis of at least one of the pose angle information of the face or the size information of the face,
   wherein the obtaining the pose angle information of the face in the image comprises:
   obtaining a face detection bounding box in the image and key point coordinates of the face determined according to the face detection bounding box; and
   obtaining, according to the key point coordinates of the face, the pose angle information of the face, the pose angle information of the face comprising a yaw angle of the face and a pitch angle of the face;
   wherein the method further comprises:
   obtaining a confidence score of the key point coordinates of the face, the confidence score of the key point coordinates being used for indicating accuracy of the key point coordinates of the face;
   after obtaining the score of the pose angle of the face, the method further comprises:
   correcting the score of the pose angle of the face by using the confidence score of the key point coordinates; and the obtaining, according to the score of the pose angle of the face and the score of the face size, a quality score of the face in the image comprises:
obtaining, according to the corrected score of the pose angle of the face and the score of the face size, the quality score of the face in the image.

2. The method according to claim 1, wherein the obtaining a face detection bounding box in the image and key point coordinates of the face determined according to the face detection bounding box comprises:
performing face detection on the image;
obtaining the face detection bounding box; and
performing key point positioning on the face in the face detection bounding box;
obtaining the key point coordinates of the face.

3. The method according to claim 1, wherein the obtaining the size information of the face comprises:
obtaining, according to a size of the face detection bounding box, the size information of the face, the size of the face detection bounding box comprising at least one of length of the face detection bounding box or width of the face detection bounding box.

4. The method according to claim 1, wherein the obtaining quality information of the face in the image on the basis of at least one of the pose angle information of the face or the size information of the face comprises:
obtaining, according to the pose angle information of the face, a score of a pose angle of the face;
obtaining, according to the size information of the face, a score of a face size; and
obtaining, according to the score of the pose angle of the face and the score of the face size, a quality score of the face in the image.

5. The method according to claim 4, wherein the obtaining a score of a pose angle of the face according to the pose angle information of the face comprises:
obtaining, according to the yaw angle and pitch angle of the face, a score $Q_{yaw}$ of the yaw angle yaw of the face and a score $Q_{pitch}$ of the pitch angle ("pitch") of the face by calculation.

6. The method according to claim 4, wherein the obtaining, according to the size information of the face, a score of a face size comprises:
obtaining the score of the face size on the basis of at least one of length, width, or area of the face detection bounding box, the area of the face detection bounding box being obtained by a product of the length and width of face detection bounding box.

7. The method according to claim 6, wherein the obtaining the score of the face size on the basis of at least one of length, width, or area of the face detection bounding box comprises:
selecting a smaller value min in the length and width of the face detection bounding box; and
obtaining, according to the smaller value min, the score $Q_{rect}$ of the face size by calculation.

8. The method according to claim 4, wherein the obtaining, according to the score of the pose angle of the face and the score of the face size, a quality score of the face in the image comprises:
obtaining, according to a score of the yaw angle and a weight of the score of the yaw angle, a score of the pitch angle and a weight of the score of the pitch angle, and the score of the face size and a weight of the score of the face size, the quality score of the face in the image by calculation.

9. The method according to claim 8, wherein the weight of the score of the yaw angle is greater than the weight of the score of the pitch angle and the weight of the score of the face size.

10. The method according to claim 1, wherein the correcting the score of the pose angle of the face by using the confidence score of the key point coordinates comprises:
determining a correction parameter a for the score $Q_{yaw}$ of the yaw angle ("yaw") of the face and the score $Q_{pitch}$ of the pitch angle ("pitch") of the face by using the confidence score of the key point coordinates, and
respectively calculating product of the correction parameter a and the $Q_{yaw}$ as well as product of the correction parameter a and the $Q_{pitch}$, the product of the correction parameter a and the $Q_{yaw}$ being used as a corrected score of the yaw angle and the product of the correction parameter a and the $Q_{pitch}$ being used as a corrected score of the pitch angle;
wherein in the case that the confidence score of the key point coordinates is smaller than a predetermined value, a value of the a is a first value, in the case that the confidence score of the key point coordinates is greater than or equal to the predetermined value, the value of the a is a second value, and the first value is smaller than the second value.

11. The method according to claim 1, wherein the obtaining at least one of pose angle information of a face in an image or size information of the face and obtaining quality information of the face in the image on the basis of at least one of the pose angle information of the face or the size information of the face comprises:
obtaining at least one of: pose angle information of a face in at least one image in multiple images or size information of the face; and
obtaining quality information of the face in the at least one image in multiple images on the basis of at least one of the pose angle information of the face or the size information of the face;
the method further comprises: selecting, according to the quality information of the face in the at least one image in multiple images, at least one image with high face quality for face detection.

12. An electronic device, comprising:
a processor; and
a memory for storing instructions executable by the processor;
wherein execution of the instructions by the processor causes the processor to perform:
obtaining at least one of pose angle information of a face in an image or size information of the face; and
obtaining quality information of the face in the image on the basis of at least one of the pose angle information of the face or the size information of the face,
wherein the obtaining the pose angle information of the face in the image comprises:
obtaining a face detection bounding box in the image and key point coordinates of the face determined according to the face detection bounding box; and
obtaining, according to the key point coordinates of the face, the pose angle information of the face, the pose angle information of the face comprising a yaw angle of the face and a pitch angle of the face;
wherein execution of the instructions by the processor further causes the processor to perform:
obtaining a confidence score of key point coordinates of the face, the confidence score of the key point coordinates being used for indicating accuracy of the key point coordinates of the face;

after obtaining the score of the pose angle of the face, the processor is further caused to perform:

correcting the score of the pose angle of the face by using the confidence score of the key point coordinates; and the obtaining, according to the score of the pose angle of the face and the score of the face size, a quality score of the face in the image comprises:

obtaining, according to the corrected score of the pose angle of the face and the score of the face size, the quality score of the face in the image.

13. The electronic device according to claim 12, wherein the obtaining the size information of the face comprises:

obtaining, according to a size of the face detection bounding box, the size information of the face, the size of the face detection bounding box comprising at least one of length of the face detection bounding box or width of the face detection bounding box.

14. The electronic device according to claim 13, wherein the obtaining quality information of the face in the image on the basis of at least one of the pose angle information of the face or the size information of the face comprises:

obtaining, according to the pose angle information of the face, a score of a pose angle of the face;

obtaining, according to the size information of the face, a score of a face size; and obtaining, according to the score of the pose angle of the face and the score of the face size, a quality score of the face in the image.

15. The electronic device according to claim 14, wherein the obtaining, according to the size information of the face, a score of a face size comprises:

obtaining the score of the face size on the basis of at least one of length, width, or area of the face detection bounding box, the area of the face detection bounding box being obtained by a product of the length and width of face detection bounding box.

16. The electronic device according to claim 14, wherein the obtaining, according to the score of the pose angle of the face and the score of the face size, a quality score of the face in the image comprises:

obtaining, according to a score of the yaw angle and a weight of the score of the yaw angle, a score of the pitch angle and a weight of the score of the pitch angle, and the score of the face size and a weight of the score of the face size, the quality score of the face in the image by calculation, wherein the weight of the score of the yaw angle is greater than the weight of the score of the pitch angle and the weight of the score of the face size.

17. A non-transitory computer storage medium, configured to store computer-readable instructions, wherein execution of the instructions by the processor causes the processor to perform:

obtaining at least one of pose angle information of a face in an image or size information of the face; and obtaining quality information of the face in the image on the basis of at least one of the pose angle information of the face or the size information of the face, wherein the obtaining the pose angle information of the face in the image comprises:

obtaining a face detection bounding box in the image and key point coordinates of the face determined according to the face detection bounding box; and obtaining, according to the key point coordinates of the face, the pose angle information of the face, the pose angle information of the face comprising a yaw angle of the face and a pitch angle of the face;

wherein execution of the instructions by the processor further causes the processor to perform:

obtaining a confidence score of key point coordinates of the face, the confidence score of the key point coordinates being used for indicating accuracy of the key point coordinates of the face;

after obtaining the score of the pose angle of the face, the processor is further caused to perform:

correcting the score of the pose angle of the face by using the confidence score of the key point coordinates; and the obtaining, according to the score of the pose angle of the face and the score of the face size, a quality score of the face in the image comprises:

obtaining, according to the corrected score of the pose angle of the face and the score of the face size, the quality score of the face in the image.

\* \* \* \* \*